United States Patent [19]

Idogaki et al.

[11] 4,442,997
[45] Apr. 17, 1984

[54] FLOW CONTROL VALVE APPARATUS

[75] Inventors: Takaharu Idogaki, Okazaki; Hisasi Kawai, Toyohashi; Kyo Hattori, Susono; Kazuhiro Sakurai, Gotenba, all of Japan

[73] Assignees: Nippon Soken, Inc., Nishio; Toyota Jidosha Kogyo Kabushiki Kaisha, Toyota, both of Japan

[21] Appl. No.: 324,087

[22] Filed: Nov. 23, 1981

[30] Foreign Application Priority Data

Dec. 26, 1980 [JP] Japan ............................... 55-183704

[51] Int. Cl.³ .............................................. F16K 31/08
[52] U.S. Cl. ..................................... 251/129; 335/230; 251/137; 251/65
[58] Field of Search .................. 251/134, 133, 129, 65, 251/137; 335/229, 230; 137/625.47

[56] References Cited

U.S. PATENT DOCUMENTS

| 3,177,385 | 4/1965 | Montagu | 335/299 X |
| 3,248,080 | 4/1966 | Plasko | 251/133 X |
| 3,323,548 | 6/1967 | Ludwig | 251/133 X |
| 3,794,868 | 2/1974 | Haigh | 335/230 X |
| 4,135,119 | 1/1979 | Brosens | 335/230 X |

*Primary Examiner*—A. Rosenthal
*Attorney, Agent, or Firm*—Kenyon & Kenyon

[57] ABSTRACT

A rotary solenoid motor adapted for use in a flow control valve apparatus. The solenoid motor having a shaft on which a valve member is connected. A torsion bar is connected between the shaft and a housing for generating a torsional force opposite to an electro-magnetic force. The shaft and the housing has a pair of portions for fixing the torsion bar. Each of the portions forms a regular polygonal cross-sectional shape.

6 Claims, 11 Drawing Figures

FLOW CONTROL VALVE APPARATUS

FIELD OF THE INVENTION

The present invention relates to a solenoid motor wherein a rotating magnet connected to a torsion bar effects an angular displacement in such a manner that an electromagnetic force for rotating the magnet is equal to a torsional spring force in the torsion bar.

BACKGROUND OF THE INVENTION

A flow control valve is well known, wherein said valve provided with an actuator of a rotary solenoid types, wherein the degree of rotation of a shaft is in proportion to an electric current applied thereto. In this type of solenoid motor, which has been recently developed, a hollow shaft is rotatably supported on a housing. A torsion bar, such as a stainless steel wire, passes through the hollow shaft. The torsion bar has a first end connected to the body adjacent to one end of the hollow shaft and a second end connected to the other end of the hollow shaft. An electro-magnetic force is generated in the hollow shaft for rotating the shaft against the torsional spring force in the torsional bar. Thus, the angular position of the shaft is controlled by changing the electro-magnetic force, so that the degree of the opening of a valve unit connected to the shaft can be controlled.

In the known rotary type of solenoid, the ends of the torsion bar are provided with split sleeves of a tapered shape for fixing the ends of the torsion bar. Each of the ends of the torsion bar is inserted to one end of the shaft or the housing, respectively, so that each sleeve effects fixation of the corresponding end of the torsion bar under a wedge action. However, the prior art connection suffers from a drawback in that it is difficult to maintain the desired effective length of the bar, so that a variation of such length is apt to occur between the valve devices. Due to the variation of the length of the torsion bar, a variation in the spring coefficient is generated, so that a single flow characteristic is not maintained between the valve devices.

SUMMARY OF THE INVENTION

An object of the present invention is to provide a solenoid motor with means for reliably fixing a torsion bar while easily maintaining the disired length of the torsion bar.

According to the present invention, a solenoid motor for effecting a limited angular rotational movement of a member connected to the solenoid motor is provided, comprising:

a housing assembly, a shaft adapted to be connected to said member, means for rotatably supporting the shaft to the housing, a torsion bar for generating a torsional force causing the shaft to be rotated, and means for generating an electro-magnetic force opposite to the torsional force, the shaft and the housing having a pair of axially spaced apart crimped portions for fixedly connecting an end of the torsion bar to the shaft and for fixedly connecting the other end of the torsion bar to the housing.

DETAILED DESCRIPTION OF A PREFERRED EMBODIMENT

Figure 1:
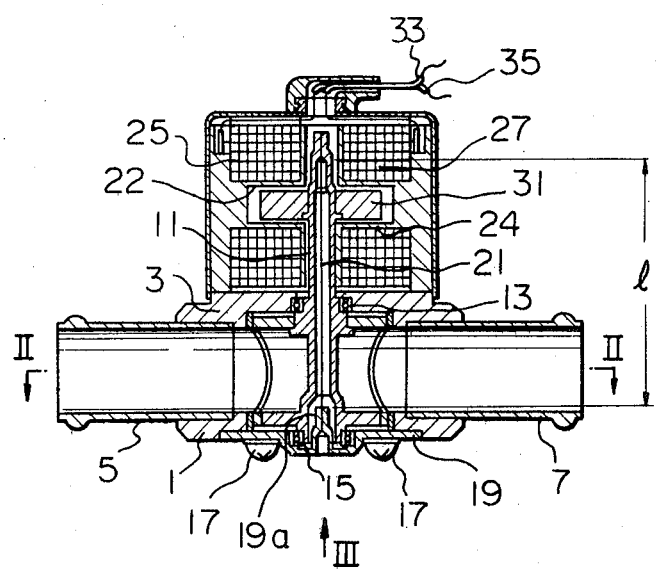
FIG. 1 is a cross-sectional view of a valve apparatus incorporated with a solenoid motor according to the present invention.
Figure 2:
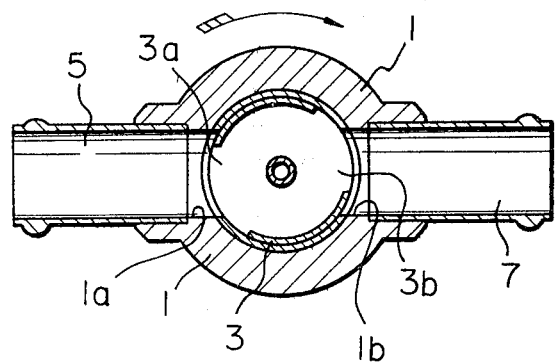
FIG. 2 is a bottom elevational view of the valve apparatus in FIG. 1.
Figure 3:
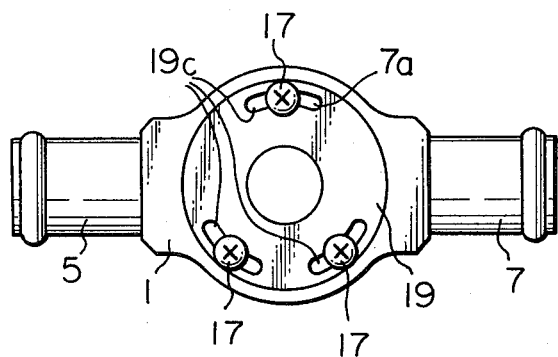
FIG. 3 is a bottom elevational view of the valve aparatus in FIG. 1.

In FIGS. 1, 2 and 3, a reference numeral 1 indicates a tubular valve housing which rotatably suports a valve rotor 3. An inlet pipe 5 and an outlet pipe 7 are fixedly connected to the valve housing 1 so that they are in communication with valve ports 1a and 1b, respectively formed in the valve housing in a diametrically opposed relationship. The valve rotor 3 contains diametrically opposed openings 3a and 3b which are always in communication. An effective flow area of the openings 3a and 3b is changed in accordance with the angular position of the rotor 3, so that the amount of flow of fluid directed from the inlet pipe 5 to the outlet pipe 7 is controlled by rotating the rotor 3.

The valve rotor 3 is fixedly connected to a hollow shaft 11, which is provided with a pair of axially spaced apart bearing units 13 and 15 for attaining the rotation of the shaft 11. The bearing unit 13 is press fitted to the housing 1. The bearing unit 15 is press fitted to an end plate member 19, which is fixedly connected to the housing 1 by means of bolts 17. A torsion bar 21, in this case a fine stainless steel wire, extends through the hollow shaft 11. As will be fully described later, the torsion bar 21 is, at one end, connected to the upper end of the shaft and is, at the other end, connected to projection 19a of the end plate 19. The torsion bar 21 produces a torsional resilient force for urging the hollow shaft 11, i.e., the valve rotor 3, toward an initial angular position. As shown in FIG. 3, the end plate 19 has angularly spaced arc-shaped slits 19c, through which the bolts 17 are inserted. Thus, a limited angular adjustment of the plate 19 can be effected when the bolts are loosened.

Figure 4:
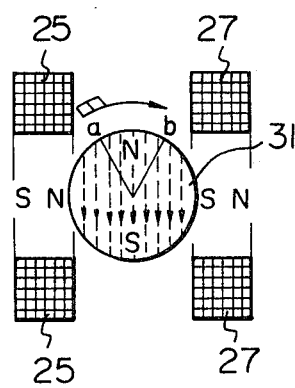
FIG. 4 is a diagrammatical view showing a principle of the rotary solenoid motor accordings to the present invention.

The apparatus includes a solenoid motor comprising laterally spaced coils 25 and 27 wound on bobbins 22 and 24, respectively. A rotating permanent magnet 31 is press fitted to the shaft 11, so that it is located between the coils 25 and 27. As shown in FIG. 4, the rotating magnet 31 has at its diametrically spaced positions opposite poles N and S. The coils 25 and 27 are connected to an electric source via electrical wires 33 and 35, respectively. When an electrical current is supplied to the coils, facing sides of the coils are magnetized in opposite directions. Thus, the coils 25 and 27, together with the rotating permanent magnet, compose a two pole electrical motor wherein an electro-magnetic force is generated for rotating the magnet 31, until the electromagnetic force is equalized to the torsional force of the bar. Thus, the angular position of the magnet 31 is changed in accordance with the value of the electrical current directed to the coils 25 and 27. For example, the rotor may be rotated between the positions a and b. As a result of this, the effective flow area, which corresponds to the amount of fluid passed through the valve, may be controlled in accordance with the value of the electric current.

Figure 6:
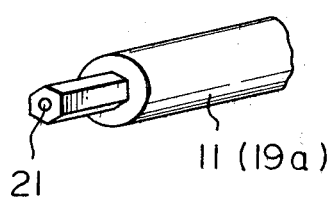
FIG. 6 is a perspective view of an end of a torsion bar fixed with a crimp, according to the present invention.
Figure 7:
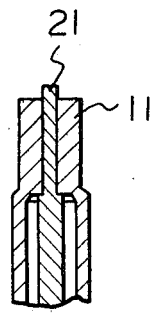
FIG. 7 shows the cross section of the torsion bar in FIG. 6.

According to the present invention, the torsion bar 21 generating a torsional force in the hollow shaft 11 opposite to the electro-magnetic force has an upper caulked end for fixedly connecting the shaft 11 with the upper end of the torsion bar 21. The end plate 19 connected to the housing 1 has a tublar projection 19a located in the lower end of the shaft. The tubular projection 19a is provided with an upper crimped end for fixedly connecting the end plate 19 with the lower end of the torsion bar 21. As shown in FIG. 6, the crimped end of the shaft 11 or the projection 19a forms, in cross section, a regular polygonal shape, such as a hexagonal shape. Thus, a uniform force is applied to the torsion bar for connecting it to the shaft or the end plate.

Figure 5:
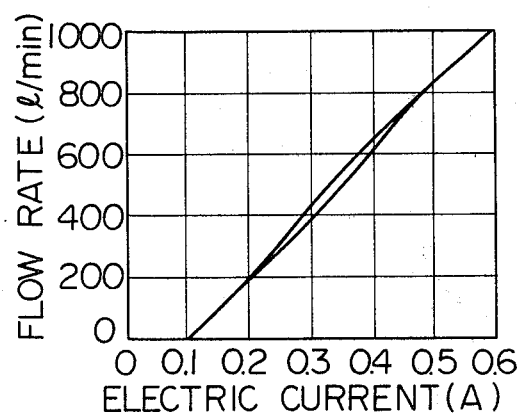
FIG. 5 shows a relationship between the electric current and the amount of flow in the valve apparatus.

As a result of the crimp around of the torsion bar, a length (l) of the torsion bar 21 is easily maintained at a predetermined constant value. Thus, no variation in the curve, as shown in FIG. 5, is generated. It should be noted that a small change of the length l causes a relatively large change in the torsional coefficient, since the torsion bar is rotated at a very limited angle, such as 60°.

Thus, variation in the length l should be surpressed, which is accomplished in the present invention.

In addition, the crimped portion forms a regular polygonal shape, so that it is uniformly engaged at the periphery of the bar 21. Thus, local deformation or concentration of stress is prevented.

It should be noted that in place of arranging the torsion bar in the shaft, it may be arranged outside of the shaft, so that the torsion bar is connected in series with respect to the shaft.

Figure 8:
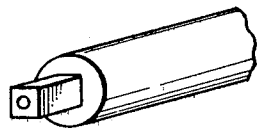
FIG. 8 is a perspective view of another way of fixing the crimp around a torsion bar.

In FIG. 8 the crimped portion forms a regular rectangular shape.

Figure 9:
FIGS. 9 through 11 are elevational views showing the various alternative shapes of crimps arranged around a torsion bar.

In FIG. 9, the crimped portion forms an hexagonal shape, having apexes outwardly projected, which are inevitably generated during the manufacturing process.

Figure 10:
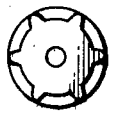

In FIG. 10, the crimped portion forms a polygonal shape having convex sides.

Figure 11:

In FIG. 11, the crimped portion forms a polygonal shape having concave sides. Outwardly extended projections may be formed on the apex.

While the present invention is described with reference to the attached drawings, many modification and change may be made by those skilled in this art without departing from the scope of the present invention.

We claim:

1. A solenoid motor for effecting a limited angular rotational movement of a member connected to the solenoid motor, the solenoid motor comprising:
a housing,
a shaft adapted to be connected to the member,
means for rotatably supporting said shaft by said housing,
a torsion bar having a predetermined polygonal cross-sectional configuration, for generating a torsional force which causes said shaft to be rotated, and
means for generating an electro-magnetic force having a direction opposite to said torsional force, said shaft and said housing having a pair of axially spaced apart crimped portions for fixedly connecting a first end of said torsion bar to said shaft and for fixedly connecting a second end of said torsion bar to said housing, said torsion bar having a round cross-sectional configuration, and a cross-sectional configuration corresponding to said predetermined polygonal configuration in the vicinity of said first and second ends thereof.

2. A solenoid motor according to claim 1, wherein said shaft is a hollow shaft, through which said torsion bar passes, and wherein there is further provided a plate member fixedly connected to said housing, said plate member having a tubular projection coaxially located in said hollow shaft, and wherein one of said crimped portions is located on one end of said shaft remote from said plate member, while said other one of said crimped portions is located at said tubular projection.

3. A solenoid motor according to claim 1, wherein each of said crimped portions forms, in a cross-section, a predetermined polygonal shape.

4. A solenoid motor according to claim 3, wherein said predetermined polygonal shape is a hexagon.

5. A solenoid motor according to claim 3, wherein said predetermined polyogonal shape is a rectangle.

6. A valve apparatus comprising:
a housing;
inlet means for introduction of fluid into said housing;
outlet means for discharging said fluid from said housing;
valve means arranged in said housing for controlling the amount of fluid flowing from said inlet means to said outlet means;
shaft means for rotatably coupling said valve means to said housing whereby said valve means is rotatably movable between a first position and a second position;
a torsion bar for generating a torsional force in a direction which urges said shaft means rotatably toward said first position; and
means for generating an electro-magnetic force in a direction opposing a force which urges said valve means to be moved rotatably toward said second position;
said shaft means and said housing having spaced apart crimped portions for coupling said shaft means and said housing to respective ends of said torsion bar, each of said crimped portions having a predetermined cross-sectional polygonal configuration, said torsion bar having a round cross-sectional configuration, and a predetermined polygonal cross-sectional configuration in the vicinity of said crimped portions of said shaft means and said housing.

* * * * *